Figure 1:
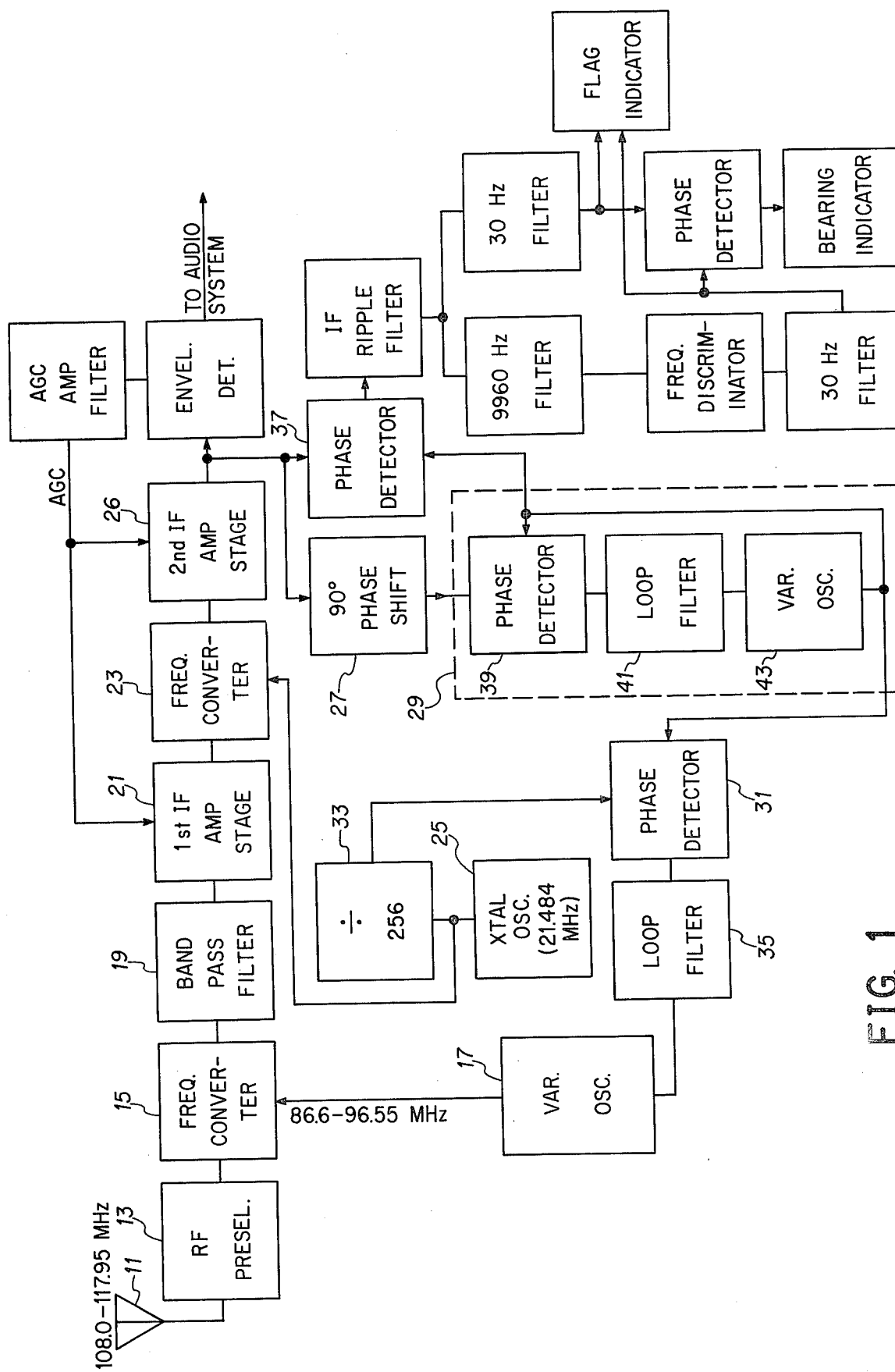

United States Patent [19]

Chelikowsky et al.

[11] 4,086,593
[45] Apr. 25, 1978

[54] AM REMOVAL AND PHASELOCK RECEIVER

[75] Inventors: Richard D. Chelikowsky, Cedar Rapids; Kenneth R. Stinson, Hiawatha, both of Iowa

[73] Assignee: Rockwell International Corporation, El Segundo, Calif.

[21] Appl. No.: 675,372

[22] Filed: Apr. 9, 1976

[51] Int. Cl.² ............................................... G01S 1/44
[52] U.S. Cl. ................................. 343/106 R; 325/346
[58] Field of Search .................... 343/106 R, 113 R; 325/346, 419

[56] References Cited

U.S. PATENT DOCUMENTS

| 3,530,383 | 9/1970 | Sassler | 325/346 |
| 3,800,125 | 3/1974 | Cleary, Jr. | 343/106 R |

*Primary Examiner*—Maynard R. Wilbur
*Assistant Examiner*—T. M. Blum
*Attorney, Agent, or Firm*—Terry M. Blackwood; Robert J. Crawford; L. Lee Humphries

[57] ABSTRACT

An amplitude modulation (AM) removal circuit comprising a phaselock loop. A phaselock VOR receiver includes said AM removal circuit.

3 Claims, 2 Drawing Figures

AM REMOVAL AND PHASELOCK RECEIVER

This invention relates generally to amplitude modulation removal and in its present application to an improved VOR receiver.

The VOR (VHF omnirange) system currently in use provides angular bearing information to aircraft in the form of a transmitter station controlled, phase difference between two 30Hz signals. One of the 30Hz signals is transmitted as AM directly on the RF carrier and the other 30Hz signal is transmitted as FM (frequency deviation equal plus or minus 480Hz) on a 9960Hz AM subcarrier. In order to meet increasing demands for additional ground stations, VOR channel spacing is being reduced from 100kHz to 50kHz in the VOR band from 108 to 117.95MHz. Reduction of the channel spacing makes the problem of receiver adjacent channel rejection more difficult because the receiver 6dB passband must presently be relatively wide (approaching 50kHz) in order to accommodate the useful information sidebands and also the transmitter and receiver frequency tolerances. Thus, the sidebands of an adjacent channel may extend onto the skirts of the filter which provides the receiver selectivity, and under the particular circumstances where there is a relatively weak (or no) signal in a selected channel, and a relatively strong signal in the adjacent channel (a condition which can arise by erroneously selecting the wrong channel), conventional VOR receivers may give an erroneous bearing indication.

The erroneous bearing indication occurs as a result of FM to AM conversion of one of the modulation sidebands of the 9960Hz subcarrier modulation. This FM to AM conversion results from slope detection on the skirt of the intermediate frequency bandpass filter which provides the receiver selectivity. More particularly frequency modulation of the 9960Hz sideband at a 30Hz rate causes it to move up and down the side of the selectivity curve, resulting in frequency modulation to amplitude modulation conversion. The resulting and unintended amplitude modulation occurring from this slope detection, when added to the original or intended 30Hz modulation, can result in an erroneous bearing indication.

The problem set forth above is more detailedly described in U.S. Pat. Nos. 3,718,928; 3,739,284; 3,745,465; and 3,665,470 all of which are assigned to the assignee of the present invention. The last listed patent (3,665,470, by Hemme) shows a system which determines and warns when the problem exists. The usual approach to actually eliminating the problem (instead of just detecting its presence) is to use a wide passband, high selectivity (steep skirt), low ripple IF filter. Such a filter is complex, difficult to build, and quite costly. Moreover, transmitter and receiver frequency drift can still result in a modulation sideband falling on the skirt of the selectivity curve, thus producing the undesired FM to AM conversion.

Figure 2:
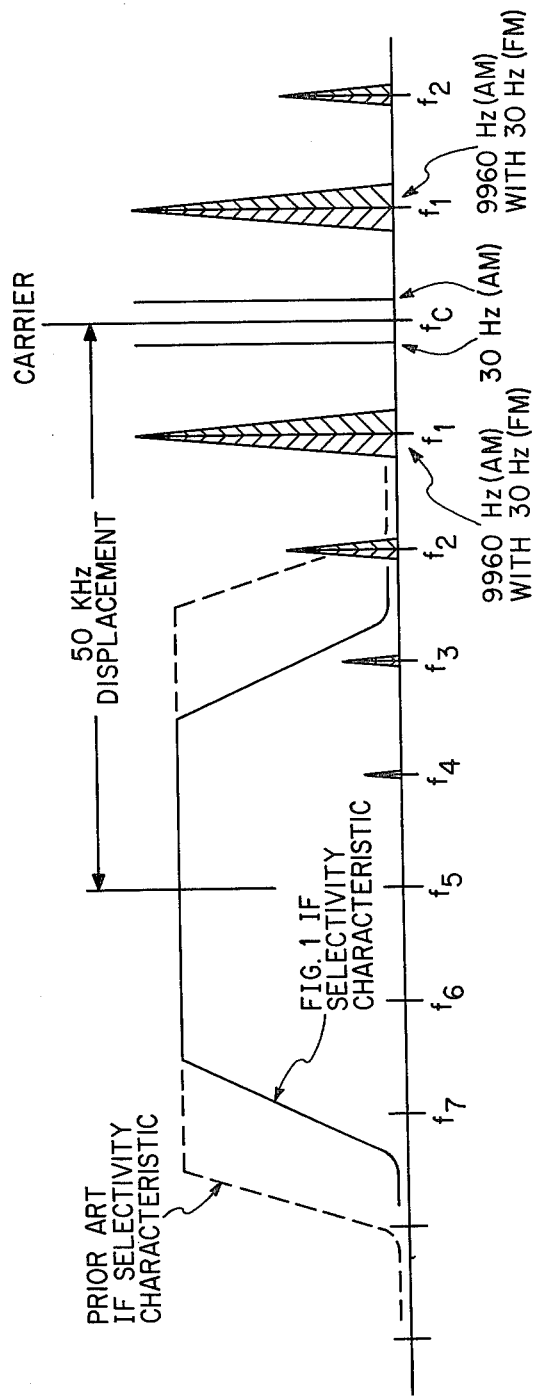

In accordance with a present inventive embodiment, an improved VOR receiver eliminates the problems of a complex and costly filter, while providing excellent adjacent channel rejection. Other aspects and features of the invention will become more apparent upon reference to the following specification, claims, and appended drawings in which:

FIG. 1 is a block diagram schematic representing the presently preferred embodiment of a receiver which incorporates the principles of the present invention, and FIG. 2 is a diagrammatic representation showing the spectral output of a VOR ground station and the relation thereto of the IF filter selectivity characteristics of two VOR receivers, each mistuned by 50kHz.

The receiver represented in FIG. 1 is a phaselock, double conversion receiver employing synchronous amplitude demodulation. Since it bears many similarities to typical phaselock receivers, little need be said about the well known and understood portions and their operation. Exemplary of typical phaselock receivers, see page 91 of Floyd M. Gardner's book, "Phaselock Techniques", John Wiley and Sons Inc. 1966. Also see U.S. Pat. No. 3,371,281 by N. R. Powell relating to a frequency lock receiver for FM.

Briefly then, the signal received from a ground station is picked up on antenna 11 and applied to RF preselector 13, which provides RF filtering, and may include amplifying and tuning means. The RF preselector output signal is applied to frequency converter, or mixer, 15 which also receives a signal from variable oscillator 17 and outputs an IF signal. This IF signal is bandpass filtered by 19, amplified by 21, and then applied to frequency converter 23 along with the locally generated signal from oscillator 25 to produce another IF. Following amplification by 26, a 90° phase shift in 27 and removal of amplitude modulation in 29, this lower IF signal is phase compared in 31 against a frequency standard generated locally through frequency division by item 33 of oscillator 25 output signal. The output signal of phase detector 31 is then low-pass filtered in loop filter 35 to produce a control signal input to variable oscillator 17. The output signal of variable oscillator 17 injectd into frequency converter 15 varies appropriately in frequency so as to phaselock the incoming received navigation signal to the frequency standard at the last IF frequency.

The two input signals to phase detector 37 are 180° out of phase (since AM removal circuit 29 introduces an extra 90° shift) and thus the phase detector 37 serves as a synchronous amplitude demodulator and provides an output signal containing both the 30Hz AM and the 9960Hz AM. As shown in FIG. 1, the phase detector 37 output signal is then filtered to remove IF ripple and to separate out the 30Hz and 9960Hz AM components. The 9960Hz component is then fed through an FM discriminator so as to recover the 30Hz FM thereon, and then the two 30Hz signals are phase compared to provide a bearing indication. As presently embodied, phase detector 37 is an integrated circuit double-balanced switching demodulator, Motorola Type MC1596. This is a transistor version of a double-balanced diode ring mixer where the output voltage is the product of an input voltage (signal) and a switching function (carrier). Other types of phase detectors can be employed.

In order to simplify channel tuning, it is preferable to embody variable oscillator 17 as a frequency synthesizer. Briefly, a voltage control crystal oscillator (VCXO), receiving filter 35 output, provides, through a frequency division circuit, input signal to a phaselock loop whose VCO in turn outputs the injection signal to converter 15. This synthesizer phaselock loop contains a variable frequency-divider in the feedback path from VCO to phase detector to enable tuning of the VCO output. Also, in order to restrict the VCO frequency and thus the receiver lock range to ±10kHz from the tuned channel center frequency, the input control signal level to the VCXO is appropriately limited at the extremes. Moreover, since prior to receiver lock the synthesizer is set up to inject into converter 15 a frequency 10kHZ off the tuned channel center, the VCXO tuning voltage is periodically clamped to a value appropriate to shift the injection frequency to the channel center so as to enhance acquisition. After acquisition, such periodic clamping ceases. Synthesizers such as that employed are common and well understood in the art.

Filter 35 is a low-pass loop filter tailored to set the bandwidth of the receiver loop and also to prevent any one phase detector 31 output signal from reaching the variable oscillator 17 input. Loop filter 35 transfer function is of the form $$F(s) = K \frac{(\tau_2 s + 1)}{(\tau_1 s + 1)}.$$

which provides fixed low and high frequency gains and a controlled transition between these two gain extremes. The two corner frequencies related to time constants $\tau_1$ and $\tau_2$ are selected to fix the loop bandwidth and control the loop damping coefficient. Presently, the 3dB loop bandwidth is in the range of approximately 30 to 40Hz.

Phase detector 31 is similar to a simple flip-flop phase detector and is commonly referred to as a digital phase-frequency discriminator. Such a detector cmprises two cross-coupled sections of NAND gate forming a flip-flop latch. Each NAND gate is driven by a separate flip-flop. The average value of the flip-flop output is then an indication of the phase-frequency relationship between its two inputs. When the flip-flop outputs "0" half the time and "1" for the remaining half, a loop lock condition exists in which the two detector input signals are phased 180° from one another. When the frequencies of the two input signals are different, the detector functions as a frequency discriminator. See U.S. Pat. No. 3,431,509. By employing a phase-frequency detector for 31, the need to frequency sweep the receiver to acquire a signal is eliminated because the received signal will be pulled in close enough for loop phaselock by virtue of detector 31 functioning as a frequency discriminator for off frequency received signals. The phase-frequency detector frequency discrimination mode enhances loop stability and reduces the likelihood of losing lock during external or internal receiver disturbances.

Presently employed for bandpass filter 19 is an 8-pole monolithic crystal filter having the following characteristics:

TABLE

| | |
|---|---|
| Bandpass Center Frequency | = 21.4MHz |
| Attenuation Variation (Ripple) Across 21.4MHz±15kHz band With respect to minimum filter attenuation, the | = 1.0dB (Maximum) |
| — 6dB Frequencies | = 21.4MHz±16kHz (Minimum) |
| — 60dB Frequencies | = 21.4MHz±27kHz (Maximum) |
| — 80dB Frequencies | = 21.4MHz±MHz±kHz (Maximum) |

It presently appears that 6dB passbands in the range of approximately 30 to 38kHz will produce satisfactory results.

In accordance with the present invention, the AM removal circuit 29 comprises a conventional phaselock loop including phase detector 39, loop filter 41, and variable oscillator 43. Heretofore in phase dependent circuits, conventional limiters of the symmetrical type have been employed to remove AM. Examples of such limiters include back-to-back zener diodes, and differential amplifiers driven into both positive and negative cutoffs. These conventional limiters work satisfactorily when the percentage AM is relatively low. But in phase dependent circuits requiring AM removal where percentage AM is in the 80-100% range (as is the case herein), the small signal level at the modulation valleys and the extremely large maximum to minimum signal amplitude ratio often cause the limiter output signal to be unsatisfactory. In the instant phaselock VOR receiver, which is one example of phase dependent circuits, the high percentage modulation causes a conventional limiter output signal to contain residual AM and/or phase perturbation which in turn causes the phase detector 31 output signal to be erratic and the receiver loop to lose lock. This unlocking problem is also a function of the type of phase detector used for phase detector 31 and the presently employed and preferred embodiment of phase detector 31 is highly susceptible to AM on either of its input signals.

Even when the percentage modulation of the IF input to circuit 29 is at or near 100%, the output signal of the AM removal circuit 29 contains no amplitude modulation and yet preserves the angle modulation of the IF signal. The variable oscillator 43 output frequency is corrected by the action of the loop so as to be identical to the input IF signal frequency and at a fixed (typically 90°) phase relationship thereto. The amplitude of the variable oscillator 43 output signal is not in any way affected or controlled by the IF input signal. The angle modulation of the IF input signal is preserved even in the deep amplitude-modulated valleys because the loop filter 41 provides a smoothing or holding, or integrating, action during these periods.

Implementation of AM removal circuit 29 can be effectively accomplished by the use of one of the many phaselock loop integrated circuits (ICPLL) now available. Presently employed is an IC phaselock loop available from Signetics Corp. under Part No. SE565K or National Semiconductor Part No. LM565H. Other usable phaselock loops include ICPLL's No. CD4046 from RCA or Motorola Part Nos. MC14046 and MC12030. Of course, discrete component loops may also be used. It presently appears, since a wide variety of phaselock loop circuits will satisfactorily serve the purpose, that only well known loop design principles need be employed. In the presently employed embodiment, loop filter 41 is a single RC section formed by an internal resistor (nominally 3.6K ohms) and an external capacitor (4700 PF). The variable oscillator 43 is a VCO which provides a digital or square wave switching signal and comprises a precision current source and a non-saturating Schmidt trigger. The current source alternately charges and discharges an external timing capacitor. The phase detector 39 is a doubly-balanced switching demodulator of the same type as phase detector 37. It should be noted that a flip-flop phase-frequency detector cannot be used for phase detector 39 due to susceptibility to AM as earlier mentioned. However, any double-balanced switching demodulator, and possibly other types, may be employed.

The phaselock loop AM removal circuit is what actually enables successful use of a phaselock receiver in the VOR signal environment and thus simultaneously permits bandpass filter 19 to have rather ordinary characteristics while making possible a significant improvement in adjacent channel rejection and bearing accuracy. More particularly phaselocking at IF allows the use of an IF bandpass narrower than that commonly employed in open loop receivers because the ground station drift is offset by the phaselock receiver; thus the IF signal is maintained in the precise center of the IF bandpass filter and the bandpass may be narrowed to one which substantially only encompasses the useful information sidebands. The increased adjacent channel rejection resulting from the narrower filter use is shown in FIG. 2 which includes both prior art and FIG. 1 IF selectivity characteristics. That is, the main problem encountered using the conventional receiver and selectivity characteristic (i.e., the skirt detection of the second 9960Hz harmonic ($f_2$) and resulting FM to AM conversion) is usually eliminated by the narrower filter.

Additionally, a more gently sloping skirt may be employed because the third 9960Hz harmonic ($f_3$) in the transmitted signal is inherently about 20dB below the second 9960Hz harmonic. The presently employed filter usually attenuates the third harmonic about an extra 25dB and thus precludes significant error arising therefrom.

Moreover, filter ripple need not be extremely low or otherwise critical because, when the receiver is properly tuned and locked to a desired signal, any FM to AM conversion of the desired signal sidebands caused by the filter ripple creates a constant bearing error which can be adjusted out or compensated for in the VOR instrumentation. The error is constant because phaselocking maintains the received signal at a fixed frequency location in the IF filter bandpass. It is preferred, however, to maintain a reasonable ripple so that any ripple-slope detection of the least attenuated adjacent channel harmonics (i.e., $f_4, f_5,$ and $f_6$) results in AM which is unusably small or too small to produce bearing error.

As will be apparent to those skilled in the art, the earlier described filter characteristics are inexpensively implemented and are representative of commercially available filters such as the presently used Piezo Technology, Inc., Orlando, FLa., Model No. TF1631.

Misinterpreting adjacent channel 9960Hz harmonics as being a desired carrier plus its 9960Hz sidebands, which can occur in open loop receivers, cannot occur here because the phaselock receiver will not lock onto any of said harmonics. Only $f_4, f_5,$ and $f_6$ are even within the earlier mentioned ±10kHz tuning range, and the frequency deviation of each of $f_4, f_5,$ and $f_6$ is so large (i.e., ±4×480Hz, ±5×480Hz, and ±6×480Hz respectively) that the receiver (whose loop bandwidth, as earlier mentioned, is approximately 30 to 40Hz) will not lock thereto. Moreover, the flag indicator of FIG. 1, which indicates whether or not both of the two phase compared 30Hz signals exceed a predetermined signal level, will indicate that no valid signal is being received.

When the situation arises that a desired signal (although acquired and locked on to) is substantially weaker than an adjacent channel interfering signal, one or more undesired 30Hz AM components (caused by ripple or slope detection of adjacent channel 9960Hz harmonics) may increase to a level which is comparison to desired 30Hz components cannot be considered insignificant. The synchronous demodulator prevents these undesired components from producing bearing error because unlike an envelope detector, the synchronous demodulator wll not output the 30Hz components which are not displaced 30Hz from the carrier.

Thus, while particular embodiments and applications have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:
1. A phaselock VOR receiver including:
  (a) one or more frequency converter means each producing an intermediate frequency (IF) signal,
  (b) receiving one said IF signal, IF bandpass filter means whose center corresponds nominally to the impressed IF,
  (c) means for providing, subsequent to said IF filtering, synchronous amplitude demodulation of one of said IF signals,
  (d) means for removing, subsequent to said IF filtering, amplitude modulation (AM) from one of said IF signals, said AM removal means comprising (i) a first phase detector means receiving IF signal at one input, (ii) a first loop filter means for low-pass filtering said first phase detector means output signal, (iii) a first variable oscillator means, controllable by said first loop filter means output signal, for supplying a variable frequency signal to a second input of said first phase detector means,
  (e) means for supplying a fixed frequency signal,
  (f) second phase detector means receiving at separate inputs, said fixed frequency signal, and said signal from said first variable oscillator means,
  (g) second loop filter means for low-pass filtering said second phase detector means output signal, and
  (h) second variable oscillator means, controllable by said second phase detector means output signal, for supplying a variable frequency signal to a frequency converter means preceding said IF filter means.
2. A receiver as defined in claim 1 wherein said IF filter means has a 6dB passband in the range of about 30kHz to 38kHz.
3. A phaselock receiver comprising one or more frequency converter means, each for outputting an intermediate frequency (IF) signal; means for bandpass filtering at least one IF signal; means for providing, subsequent to said filtering, synchronous amplitude demodulation of one of said IF signals; means for removing, subsequent to said filtering, amplitude modulation (AM) from an IF signal, said means for removing AM comprising phaselock loop means including phase detector means having a first input connected for receiving IF signal, low-pass filter means for filtering the phase detector means output signal, variable oscillator means, controllable by said low-pass filter means output signal, for supplying a variable frequency signal to a second input of said phase detector means, said variable oscillator means supplying a signal which is free of amplitude modulation but tracks, in frequency and phase, the signal appearing at the phase detector means first input; and means responsive to said AM removal means for providing a feedback signal of appropriate frequency and phase to a frequency converter means preceding said IF filter means, said means providing a feedback signal including a second phase detector means receiving said AM removal means variable oscillator output signal, a second low-pass filter means receiving said second phase detector means output signal, and a second variable oscillator means receiving said second loop filter means output signal.

* * * * *